United States Patent Office 2,933,541
Patented Apr. 19, 1960

2,933,541

PROCESS FOR PREPARING ORTHO DIVINYLBENZENES

Fred W. Hoover, Wilmington, Del., assignor to E. I. du Pont de Nemours and Company, Wilmington, Del., a corporation of Delaware No Drawing. Application June 9, 1958
Serial No. 740,556

7 Claims. (Cl. 260—669)

This invention pertains to o-divinylbenzenes and more particularly to an improved method for their preparation.

The vinylbenzenes are promising components of addition polymers. Realization of this promise has been hampered by the unavailability of methods for their preparation in large volume at low cost. A way of making these compounds, particularly o-divinylbenzene, from readily available, low-cost intermediates is highly desired.

The present invention provides a method for making o-divinylbenzenes which comprises contacting divinylacetylene and an acetylene or certain other acetylenes with a catalyst consisting essentially of a metal alkyl, or metallic hydride, of an element from groups I to III, and a compound of a transition metal from groups IV to VIII of the periodic table.

The periodic table referred to herein is the one appearing in Deming's "General Chemistry," John Wiley & Sons, Inc., 5th ed., Chap. 11.

In the process of this invention a dry, deoxygenated reactor is charged with catalyst and reaction medium. The charge is then cooled to $-80°$ C. and the acetylene and divinylacetylene are added separately. The reaction mixture is permitted to warm to reaction temperature, about which more will be said later, and is held at reaction temperature until there is no further reaction as evidenced by cessation of pressure drop. The catalyst is then deactivated. The reaction mixture is permitted to come to room temperature, and the contents discharged. The desired o-divinylbenzene is isolated from the reaction product by distillation or other methods known to those skilled in the art.

In the specific examples which follow, it will be seen that the process has been carried out at atmospheric pressure. This simplifies equipment requirements, and is therefore the preferred way of operating. If desired, however, the reaction can be carried out under autogenous or externally applied pressures, but this offers no advantages.

The range of operating temperature is $-80°$ C. to $+100°$ C., but since the best balance of product yield with good temperature control is $-20°$ C. to $+15°$ C., the reaction is usually carried out in this range.

Theoretically the mole ratio of the acetylene to divinylacetylene required to produce o-divinylbenzene is 2:1. One or the other of the acetylene or dinvinylacetylene can be used in excess of the theoretically required amount. Alternatively, the reaction can be carried to a partial conversion to o-divinylbenzene and the starting materials recycled.

The catalysts used in the process of the invention are combinations of a metal alkyl, or metallic hydride, of a metal from groups I to III with (2) a compound of a transition metal from groups IV to VIII, particularly a transition metal halide.

Included among the specific metal hydrides from groups I to III which are operative are lithium, sodium, potassium, calcium, strontium, magnesium, zinc, boron, and aluminum hydrides. Specific metal alkyls which function satisfactorily in the process of the present invention include butyllithium, diethylzinc, dibutylmagnesium, triethylaluminum, triamylaluminum, trimethylboron, and the like. The preferred compounds are those which are capable of acting as reducing agents for the transition metal compounds.

Among the transition metal compounds of groups IV to VIII which are used with the metal alkyls and hydrides to form catalysts are $TiCl_3$, $TiF_4$, $TiCl_2$, $ZrCl_2$, $ZrCl_3$, $ZrBr_2$, $FeCl_3$, $VOCl_3$, $VCl_5$, $MoCl_6$, $MoCl_5$, $CoCl_2$, $NiCl_2$, titanium isopropoxide, and the like. Preferred of this class of operative metal compounds is titanium tetrachloride.

The mole ratio of groups I to III metal hydride or metal alkyl to transition metal compound of groups IV to VIII is not critical but is generally within 10:0.10 to 1:10.

The manner in which the group I to III metal hydride or metal alkyl and transition metal compound from groups IV to VIII interact to form the catalyst is not known. Merely contacting the two seems to suffice.

The quantities of group I to III metal hydride or metal alkyl and of transition metal compound from groups IV to VIII used are such as to induce the desired reaction, i.e., the cyclic condensation of the acetylene with divinylacetylene to produce o-divinylbenzene, at a practical rate under the conditions of temperature and pressure used. The quantity of metal hydride and metal alkyl catalyst may vary widely but it is within the range of 0.1 to 100% by weight of the divinylacetylene used. Generally the best results are obtained employing from 1 to 85% of catalyst and this is the amount preferably used.

The reaction is effected in the presence of an inert reaction medium. Hydrocarbons such as, for instance, toluene, xylene, cyclohexane, and decahydronaphthalene constitute preferred media. The amount of reaction medium is not critical and it can equal to or exceed the amount of divinylacetylene used by 100 or more times.

The acetylenes used in the cyclocondensation process of this invention correspond to R—C≡C—R' in which R and R' can be the same or different and represent hydrogen or monovalent hydrocarbon free of aliphatic unsaturation, e.g., alkyl, especially short chain alkyl, i.e., of less than 7 carbons, aryl of not more than 10 carbons and cycloalkyl of not more than 7 carbons. Examples are acetylene, monophenylacetylene, diphenylacetylene, cyclohexylacetylene, hexyne-2, hexyne-3, and the like.

Although the following illustrative examples describe the process as a batch operation, it is to be understood that as a practical commercial operation semi-continuous or continuous operation is preferred because it makes it possible to recover unconverted reactants and thus reduce costs.

o-Divinylbenzenes, including dimethyl-o-divinylbenzene and o-divinylbenzene itself, are polymerizable monomers, yielding polymers which are useful for moldings, films, and coatings.

To more fully understand the invention, reference should be had to the following examples which are for illustrative purposes only and which should not be regarded as limiting the catalysts, conditions or modes of operation of the invention.

*Example I*

To a dry, deoxygenated 1-liter reactor, equipped with a mechanical stirrer, condenser, separatory funnel for addition of divinylacetylene, gas addition tube (open-end type) extending below liquid level, and a thermocouple well, there is added 200 ml. of calcium hydride dried toluene. A solution of 20 g. of divinylacetylene in 60 ml. of toluene, and dried over calcium hydride, is placed in the addition funnel. Triisobutylaluminum (5 ml.) is added to the reactor under nitrogen by means of a hypodermic syringe, followed by titanium tetrachloride (1.5 ml.). The deep black liquid is cooled to −20° C. in an acetone bath and the bath held at −20° C. by addition of solid carbon dioxide as needed. The temperature of the reaction mixture is measured by means of a copper-constantan thermocouple.

Dry oxygen-free acetylene (scrubbed with water, sulfuric acid, basic pyrogallol, sulfuric acid, and anhydrous calcium sulfate) is added at the rate of 1 mole/hour, and the divinylacetylene solution is added in the course of 2 hours. Throughout the reaction the temperature is maintained between −25° and −20° C. One-half hour after completion of the addition of divinylacetylene, the catalyst is deactivated by addition of 50 ml. of anhydrous methanol. The mixture is allowed to warm to room temperature, filtered under nitrogen, and the yellow filtrate is distilled. o-Divinylbenzene (10 g., 30% yield) is collected at 59–60° C./4.5 mm. Its identity is confirmed by infrared spectral analysis.

*Example II*

The reactor of Example I is flushed with nitrogen and charged with 50 ml. of toluene dried over sodium. Triisobutylaluminum (10 ml.) and titanium tetrachloride (1.5 ml.) are added in turn by means of hypodermic syringes. Acetylene flow is adjusted to one mole/hour. An acetone bath to cool the reaction vessel is held at −25° C. by addition of solid carbon dioxide as needed. A solution of divinylacetylene (13 g., in 20 ml. of toluene) which had previously been dried over calcium hydride is added dropwise over the course of two hours. The reaction temperature is approximately −10° C. Acetylene flow is stopped one-half hour after completion of the addition of the divinylacetylene solution. Methanol (50 ml.) is added along with 1 g. of phenyl-β-naphthylamine. The reaction mixture is filtered and the filtrate distilled. o-Divinylbenzene, 7.1 g., B.P. 55–57° C./4 mm. (33% yield), is collected.

*Example III*

The reactor of Example I is flushed with nitrogen and charged with 150 ml. of toluene dried over sodium. Triisobutylaluminum (10 ml.) and titanium tetrachloride (1.5 ml.) are added in turn by means of hypodermic syringes. The catalyst solution is cooled in ice water and acetylene passed under the solution at eight-tenths mole/hour. A solution of divinylacetylene (16 g. in toluene, 30 ml.) previously dried over calcium hydride is added over the course of two hours. The temperature of the reaction solution is 15–20° C. Methanol, 50 ml., along with 5 g. phenyl-β-napthylamine is added. The solution is filtered and distilled. o-Divinylbenzene, 8 g., B.P. 52° C./3 mm. (30% yield), is collected.

*Example IV*

This example illustrates the polymerization of o-divinylbenzene.

A solution of 1 ml. of o-divinylbenzene and 0.02 ml. of tert. butyl peroxide in 9 ml. of chlorobenzene was warmed at reflux (132° C.) under nitrogen for 7.5 hours. The resulting polymer solution was poured into 50 ml. of methanol to separate the polymer as an infusible white solid (0.17 g.), which was readily soluble in benzene. Infrared analysis showed absorption attributable to both vinyl and polystyrene units, indicating that only one of the two vinyl groups of o-divinylbenzene was involved in the polymerization.

*Example V*

To a dry 500 ml. reactor equipped with a mechanical stirrer, condenser, dropping funnel, gas addition tube (open-end type) extended below liquid level and a thermometer, there is added 200 ml. of calcium hydride dried toluene. Triisobutyl-aluminum (5 ml.) is added to the reactor under nitrogen by means of a hypodermic syringe, followed by titanium tetrachloride (1.5 ml.). Methylacetylene, dried by passing it through a tower containing calcium sulfate, is added at the rate of 1.2 moles/hour. Concurrently, a solution of 15.6 g. of divinylacetylene in 50 ml. of toluene is added dropwise over a period of 80 minutes. Throughout the reaction, the temperature is maintained between 9° C. and 16° C. by means of an ice bath. Ten minutes after completion of the addition of the divinylacetylene, the catalyst is deactivated by addition of 50 ml. of methanol. On distillation, 40 g. of trimethylbenzenes are collected at 32° C./2 mm. and 9 g. (28% yield) of dimethyl-o-divinylbenzenes at 50–51° C./0.2 mm. The identity of these products is determined by infrared and ultraviolet spectral analyses. The molecular extinction coefficient of the dimethyl-o-divinylbenzenes is 23,200 at 228 mμ as compared to 20,400 at 229 mμ for o-divinylbenzene.

The dimethyl-o-divinylbenzene prepared as above can be polymerized alone or in conjunction with other polymerizable co-monomers, e.g., styrene, allyl and methallyl alcohol esters of carboxylic acids, unsaturated ethers and ketones containing the grouping $H_2C=C<$, diene hydrocarbons, e.g., butadienes, etc. The resulting copolymers have decreased solubility and are useful as protective coatings for rigid substrates. The homopolymers and copolymers are also useful as molding plastics for the production of shaped objects, e.g., rods, tubes, and the like. The dimethyl-o-divinylbenzene can be partially polymerized and the partial polymer mixed with a preformed polymer, e.g., an alkyd resin, styrene, etc., in a common solvent, the solution applied to a rigid or flexible substrate and the polymerization completed in situ to produce a coating which has decrease solubility and thermal sensitivity.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. A process for preparing o-divinylbenzenes which comprises contacting divinylacetylene and an acetylene having the formula $RC{\equiv}CR'$ in which R and R' are the same or different and are members of the group consisting of hydrogen and monovalent hydrocarbon radicals free of aliphatic unsaturation with a catalyst composed of (1) a member of the group consisting of metal alkyls and metallic hydrides, the metallic element of each being from groups I to III of the periodic table, and (2) a transition metal compound, said metal being from groups IV to VIII of the periodic table.

2. The process of claim 1 wherein reactants and catalyst are contacted in an inert medium.

3. The process of claim 1 wherein contact between reactants and catalyst is effected at a temperature of from −80° C. to 100° C.

4. The process of claim 1 wherein said catalyst is present in an amount of from 0.1 to 100% by weight of divinylacetylene.

5. The process of claim 1 wherein said transition metal compound is a transition metal halide.

6. The process of claim 1 wherein said organometallic compounds are capable of acting as reducing agents for said transition metal compound.

7. A process for preparing o-divinylbenzenes which comprises contacting at a temperature of from −20° to 15° C. and atmospheric pressure and in an inert medium an acetylene of the formula RC≡CR', wherein R and R' are members of the group consisting of hydrogen, alkyl, aryl of not more than 10 carbon atoms and cycloalkyl of not more than 7 carbon atoms, and divinylacetylene in the presence of from 1 to 85% by weight of a catalyst based on divinylacetylene, said catalyst consisting of (1) a transition metal halide, said metal being from groups IV to VIII of the periodic table, and (2) a member of the group consisting of metal alkyls and metallic hydrides, the metallic element of the compounds and hydrides being from groups I to III of the periodic table, said metallic alkyls being reducing agents for said transition metal halide, and maintaining the resulting reaction mixture at said temperature until cessation of pressure drop.

References Cited in the file of this patent

UNITED STATES PATENTS

| | | |
|---|---|---|
| 2,211,524 | Stanley et al. | Aug. 13, 1940 |
| 2,385,696 | Dreisbach | Sept. 25, 1945 |
| 2,723,299 | Tanaka et al. | Nov. 8, 1955 |
| 2,733,281 | Dreisbach et al. | Jan. 31, 1956 |

FOREIGN PATENTS

| | | |
|---|---|---|
| 538,782 | Belgium | Dec. 6, 1955 |